B. R. SHOVER.
SYSTEM OF ELECTRICAL DISTRIBUTION.
APPLICATION FILED DEC. 24, 1906.
921,630.
Patented May 11, 1909.
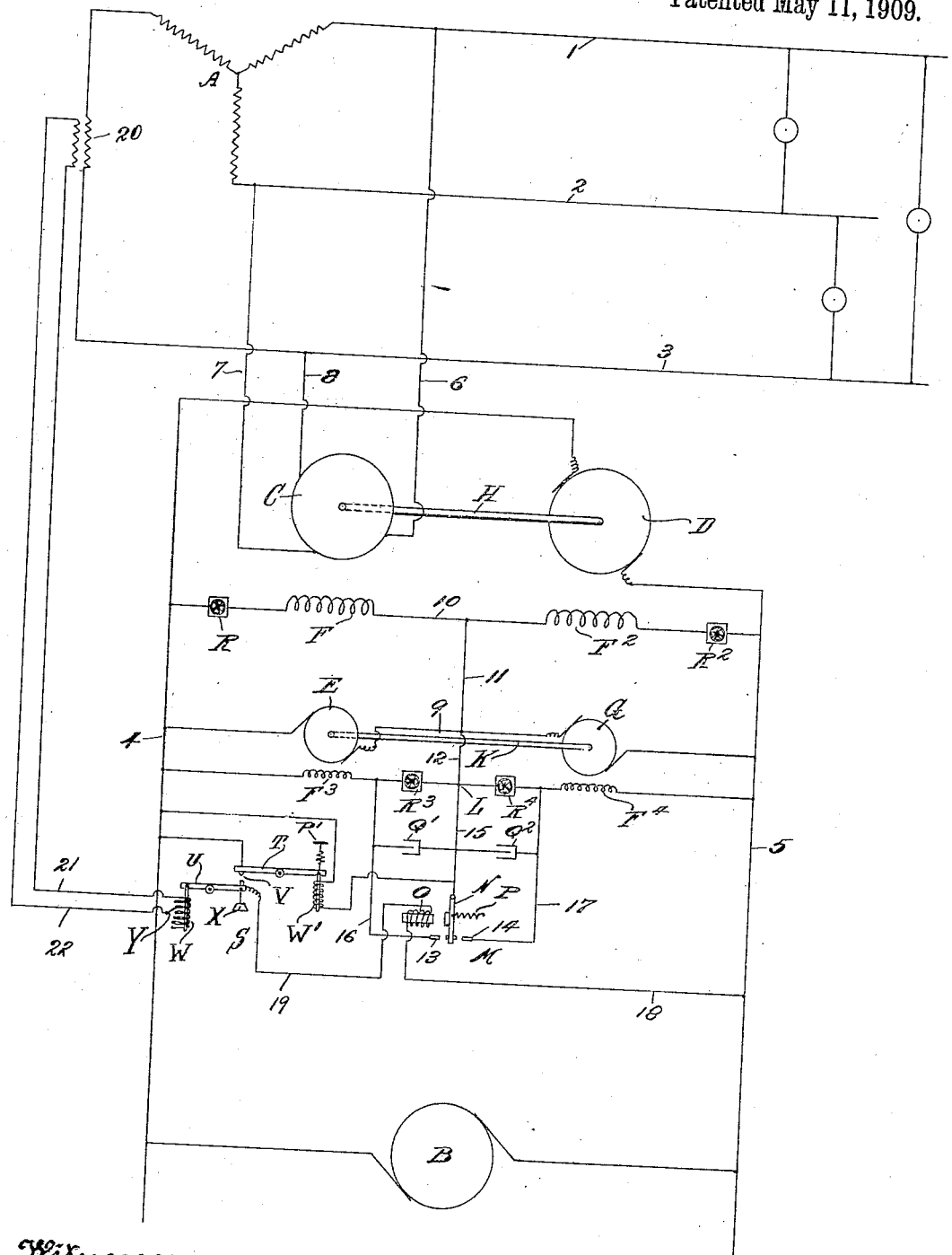
Witnesses:
Frank E. French
Inventor:
Barton R. Shover
By Augustus B. Stoughton
Atty

UNITED STATES PATENT OFFICE.

BARTON R. SHOVER, OF CHICAGO, ILLINOIS, ASSIGNOR TO ELECTRIC STORAGE BATTERY COMPANY, OF PHILADELPHIA, PENNSYLVANIA, A CORPORATION OF NEW JERSEY.

SYSTEM OF ELECTRICAL DISTRIBUTION.

No. 921,630.

Specification of Letters Patent.

Patented May 11, 1909.

Application filed December 24, 1906. Serial No. 349,280½.

*To all whom it may concern:*

Be it known that I, BARTON R. SHOVER, a citizen of the United States, and a resident of Chicago, in the county of Cook and State of Illinois, have invented a certain new and useful System of Electrical Distribution, of which the following is a specification.

One object of the present invention is to provide quick acting means for controlling the operation of electro-dynamic transforming apparatus, and another object of the invention is to provide for properly controlling the transfer of energy between direct current and alternating current circuits in response to changes of electrical condition.

In the drawings is illustrated diagrammatically a system of distribution embodying features of the invention. A, is a three-phase alternating current generator furnishing current to the consumption circuit 1, 2, 3. Connected to the same circuit, in parallel with the generator A, by the conductors 6, 7, and 8, is an alternating current dynamo machine C, to which is mechanically connected, as by the shaft H, a direct current dynamo machine D. The latter is electrically connected to the direct current circuit 4—5, and operates in parallel with a source of direct current B.

F, is the field winding of the machine C, and $F^2$, is the field winding of D. These two field windings are connected in series with each other across the circuit 4—5, and the two field rheostats R and $R^2$, one for each field, are connected into the circuit in the usual manner. Across the same circuit 4—5, are connected in series with each other the armatures of the exciters E and G, which are also mechanically connected as by the shaft K. The conductor 9, which joins the two exciter armatures is connected by means of the conductor 11, to the conductor 10, which joins the field windings F, and $F^2$. The voltage impressed upon the field windings F, and $F^2$, will vary with the voltage developed in the armatures E, and G, and since these two armatures are connected in series across the circuit 4—5 the sum of these latter voltages is constant and equal to the voltage of the circuit 4—5, and if one increases, the other will decrease by the same amount. The armatures E, and G, being mounted on the same shaft must revolve at the same speed, and the division of voltage between them will be determined by the relative amounts of currents flowing in their respective field windings $F^3$ and $F^4$. These two field windings are also connected in series with each other across the circuit 4—5, and the conductor joining them is connected at the point L, by means of the conductor 12, to the junction point between the armatures E and G. The current in the field windings $F^3$, and $F^4$, will therefore be determined by the voltage of the machines E, and G, modified however, by the rheostats $R^3$ and $R^4$, which are connected respectively between the fields $F^3$ and $F^4$, and the junction point L.

For the purpose of controlling the current in the field windings $F^3$, and $F^4$, the regulating apparatus shown at M, and S, is introduced. A conducting lever N, is pivoted at one end and vibrates between the contacts 13, and 14, at the other end. This lever is electrically connected to the junction point L, by means of the conductor 15. Contact points 13, and 14, are connected by conductors 16, and 17, respectively to the terminals of the rheostats $R^3$ and $R^4$ opposite to the terminals thereof which are connected to L. When the lever N, makes contact with 14, it short-circuits the rheostat $R^4$, and the operation of rheostat $R^3$, is not affected. On the other hand, when lever N, makes contact with 13, the rheostat $R^3$, is short-circuited and the operation of rheostat $R^4$, is not affected. Condensers $Q^1$ and $Q^2$, are connected across the rheostats $R^3$, and $R^4$, respectively, to suppress the spark when the short-circuits above mentioned are opened by the movement of the lever N. The position of the lever N, is determined by the action of the electro-magnet O, opposed by the spring P. When O, is energized, it pulls the lever N, into contact with 13. When the circuit which energizes the magnet O, is opened, the spring P, pulls N, into contact with 14. The coil which energizes the magnet O, is connected across the circuit 4—5, by the conductor 18—19. In this conductor as shown in the part 19 thereof, is interposed a make-and-break device shown at S. This device comprises two levers T, and U, each pivoted near its middle point, and making contact with each other at one end by means of the contacts shown at V. Conductor 19, is connected to lever U and lever T, is connected to conductor 4, so that when the contact at V, is closed, the electro-magnet O, is energized. From the opposite end of lever U, is suspended the core of a solenoid W, which is energized by current from the alternating current line. As shown, the current is derived by means of conductors 21 and 22, from the secondary of the series transformer 20, whose primary is connected into one phase 3, of the alternating current circuit, between the terminal of the generator A, and the junction point of conductor 8, leading to the alternating current machine C. The current in solenoid W, will therefore vary with the load on the generator A. From the other end of lever U, is suspended a weight X. This weight may be adjusted to balance the pull of the solenoid with any desired load on the generator A, or the pull of the solenoid may be adjusted for any desired load by cutting coils in and out as by the switch Y. From the end of lever T, opposite to V, is also suspended the core of a solenoid $W^1$, whose pull is opposed by an adjustable spring $P^1$. The solenoid $W^1$, is connected between conductors 4 and 15, and is subjected to the voltage at the terminals of the exciter armature E. The effect of $W^1$, is therefore to vary the position of lever T, in response to changes in the voltage of exciter E.

The operation of the apparatus shown is then as follows: When the load on the consumption circuit 1, 2, 3, is equal to that which it is desired that the generator A, should furnish, the adjustment is such that the motor generator set C—D, is not transferring energy in either direction between the alternating current circuit 1, 2, 3, and the direct current circuit 4—5. The lever N, will vibrate continuously between the contact points 13 and 14, for as soon as it is drawn into contact with 13, by the electromagnet O, the rheostat $R^3$, will be short-circuited, producing an increase of current in the field F, and therefore increasing the voltage of the exciter E, at the expense of that of G. The result of this will be to increase the pull exerted by the solenoid $W^1$, thus breaking the contact at V and interrupting the current in solenoid O, which will release the lever N, permitting it to break contact with 13, and make contact with 14. The result of this will be to open the short-circuit around rheostat $R^3$ and close that around rheostat $R^4$, and the potential of exciter E, will fall while that of G, will rise. The fall of potential of E will reduce the pull of solenoid $W^1$, permitting the lever T, to restore contact at V, the solenoid O will again be energized and the above described cycle will be repeated. Only a very minute motion of the lever T will be required to produce the results above described, and therefore only a very slight variation of the voltage of the exciter E will occur on either side of the mean value necessary to give the excitation of the machines C and D, required to maintain the desired load distribution. If the load on the consumption circuit 1, 2, 3, should increase, a small increase getting back to the generator A, will increase the pull of solenoid W, on lever U, closing the contact V, which will remain closed until the effect of the electromagnet O, on the arm N, shall have kept the rheostat $R^3$, short-circuited for a sufficient length of time to produce the necessary increase of voltage in exciter E, and decrease of voltage in exciter G, required to cause the motor generator set C—D, to transmit enough energy from the circuit 4—5, to the circuit 1, 2, 3, to supply the increase of load on the latter. This will establish a new position for the levers U and T, determined by the voltage of exciter E, necessary to produce the desired results, and by the effect of this voltage on the solenoid $W^1$. Having established this new position the lever N, will continue to vibrate between the contacts 13 and 14 in response to the making and breaking of contact at V, with the slight changes of voltage of exciter E, produced by the vibration of lever N. Should the load on the consumption circuit 1, 2, 3, decrease, effects the reverse of those just described will take place. A small decrease in load on the generator A producing a decrease in the pull of solenoid W, on the lever U, will open the contact at V, and thus interrupt the current which energizes the magnet O. This will release the lever N, allowing it to come in contact with 14, thus short-circuiting the rheostat $R^4$. The result of this will be to increase the voltage of exciter G, and decrease the voltage of exciter E, thus causing the alternating current machine C, to receive current from the circuit 1, 2, 3, and the direct current machine D, to deliver current to the circuit 4—5. The decrease in the voltage of exciter E, by its effect on the solenoid $W^1$, will establish a new position for the lever T, corresponding to the voltage of exciter E, which is necessary to maintain the desired transfer of energy from the circuit 1, 2, 3, to the circuit 4—5. Having thus established this new position of the lever T, equilibrium will again be restored and the lever N, will continue to vibrate as above described. It will be seen that so long as the weight of X and the number of coils of W, included in the circuit remain the same, the load on generator A, will remain practically constant, since equilibrium of the lever U, can only be maintained for one particular load on generator A, and any departure from this load will cause the regulating apparatus to act in such manner on the motor generator set, C—D, as to restore the equilibrium.

I claim:

1. In combination, an alternating current consumption circuit and its source; a direct current circuit and its source; transforming apparatus connected to both circuits and adapted to transfer energy from either circuit to the other and provided with field windings connected in series with each other and whereof one is adapted to control its alternating current electro-motive-force, and the other is adapted to control its direct current electro-motive-force; exciting means including synchronously rotating armatures electrically connected in series across the outer terminals of the two field windings; an electrical connection from the circuit between the two exciter armatures to the circuit between the two field windings; and means responsive to changes of load on the alternating current circuit for varying simultaneously and inversely the voltage of the two armatures of the exciter set.

2. In combination an alternating current consumption circuit and its source, a direct current circuit and its source; transforming apparatus connected to both circuits and adapted to transfer energy from either to the other, and provided with two field windings whereof one is adapted to control its alternating current electro-motive-force, and the other is adapted to control its direct current electro-motive-force; means for connecting said field windings in series with each other across a source of exciting current, an exciter set including two armatures mechanically connected and electrically connected in series with each other across the said source of exciting current; an electrical connection from the circuit between the two armatures to the circuit between the two field windings; and means responsive to changes of load on the alternating current circuit for varying the division of electro-motive-force between the two armatures.

3. In combination an alternating current consumption circuit and its source, a direct current circuit and its source; transforming apparatus connected to both circuits and adapted to transfer energy from either to the other and provided with two field windings whereof one is adapted to control its alternating current electro-motive-force and the other is adapted to control its direct current electro-motive-force; means for connecting said field windings in series with each other across a source of exciting current, and means responsive to changes in the electrical condition of the alternating current circuit for varying the potential of the junction between the two windings with respect to that of the terminal of the source of exciting current.

4. Means for controlling the operation of electro-dynamic transforming apparatus which comprises a balancing set for controlling the respective fields of said apparatus and electro-magnetic means for controlling the fields of the balancing set, substantially as described.

5. Means for controlling the operation of electro-dynamic transforming apparatus in response to changes of electrical condition of a circuit, which comprise a balancing set for controlling the respective fields of said apparatus, and electro-magnetic vibrating devices responsive to such changes and adapted to control the fields of the balancing set, substantially as described.

In testimony whereof I have hereunto signed my name.

BARTON R. SHOVER.

In the presence of—
J. LESTER WOODBRIDGE,
E. VAIL STEBBINS.